INVENTOR.
GEORGE B. LUKENS II
BY James J. Williams
HIS ATTORNEY

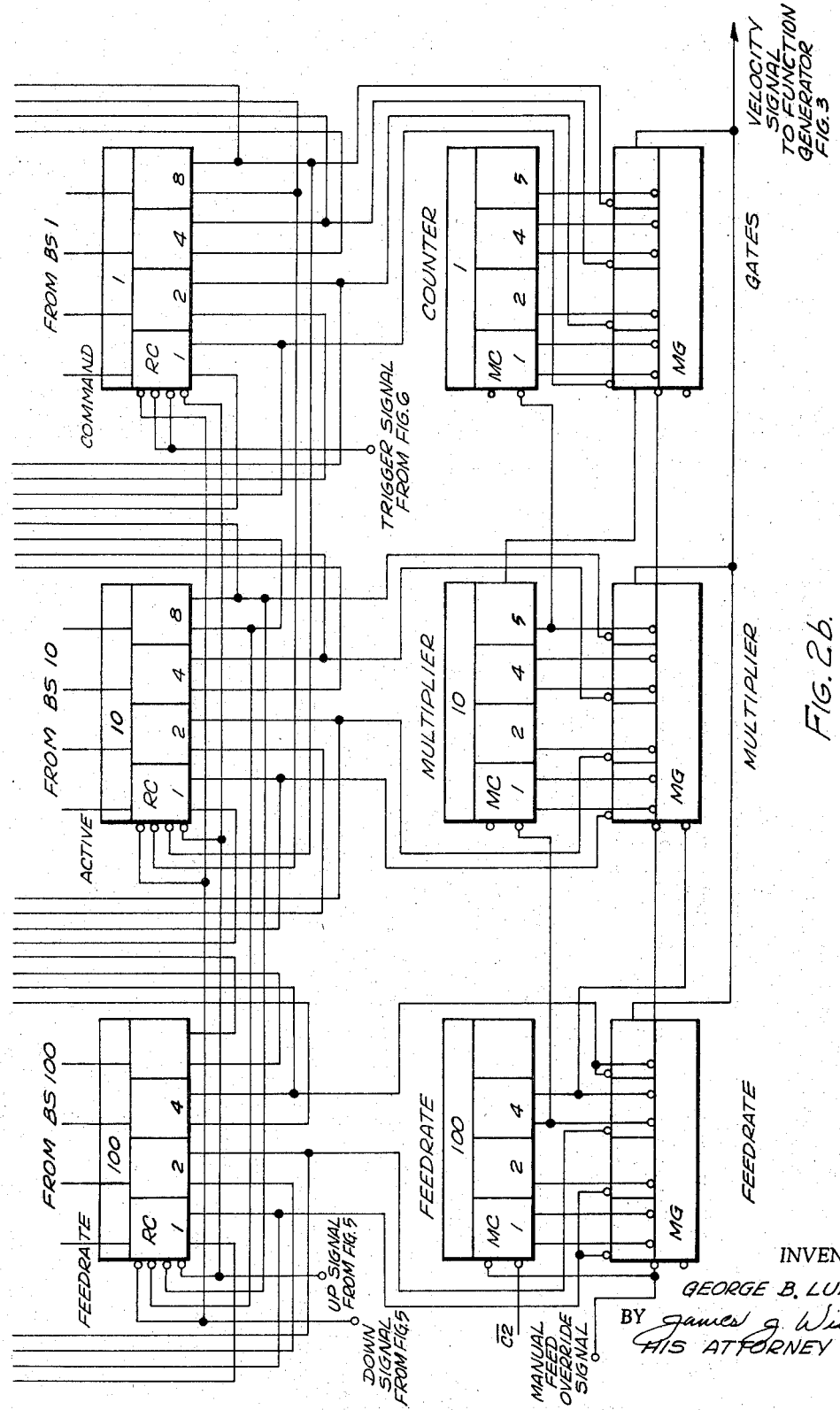

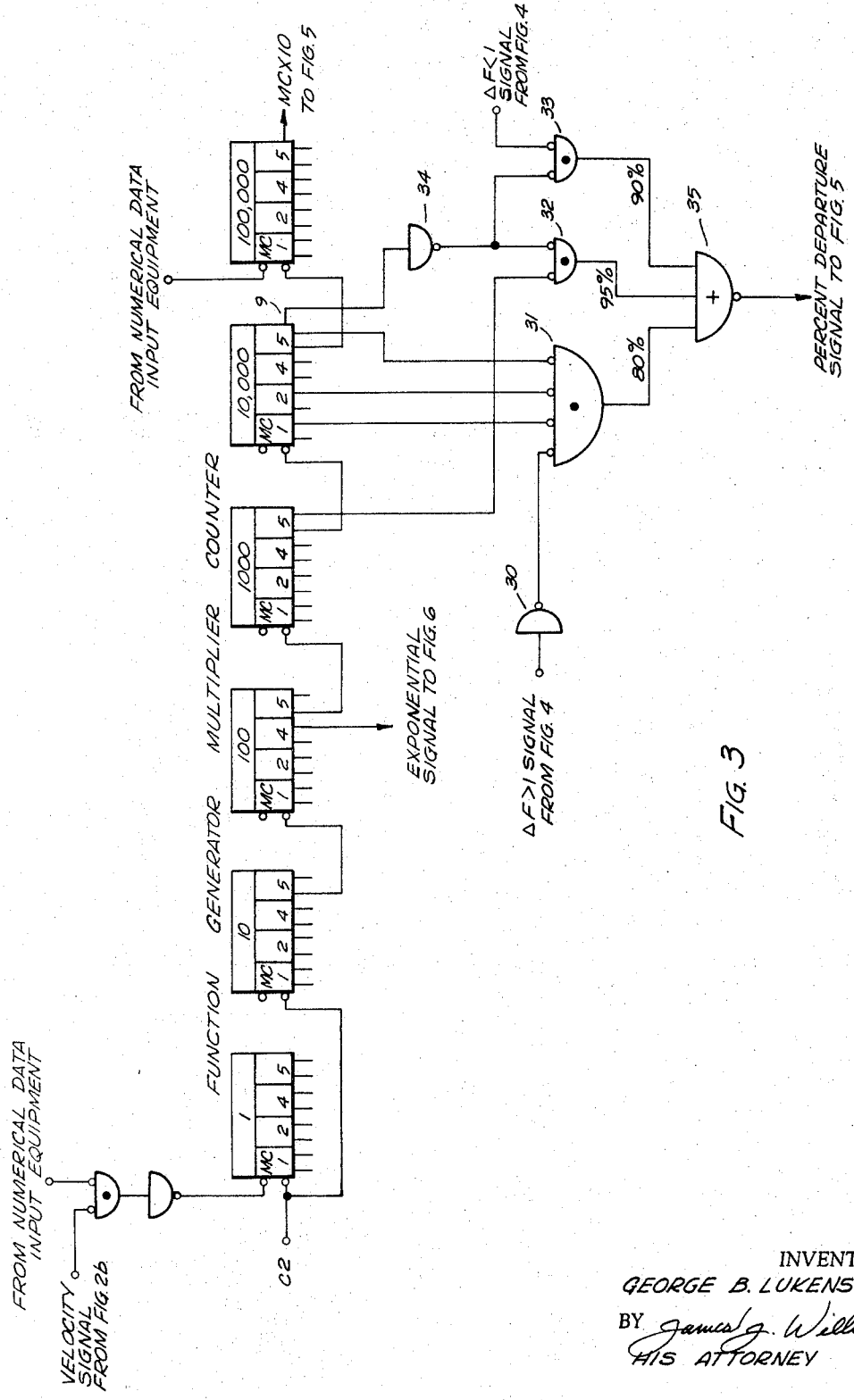

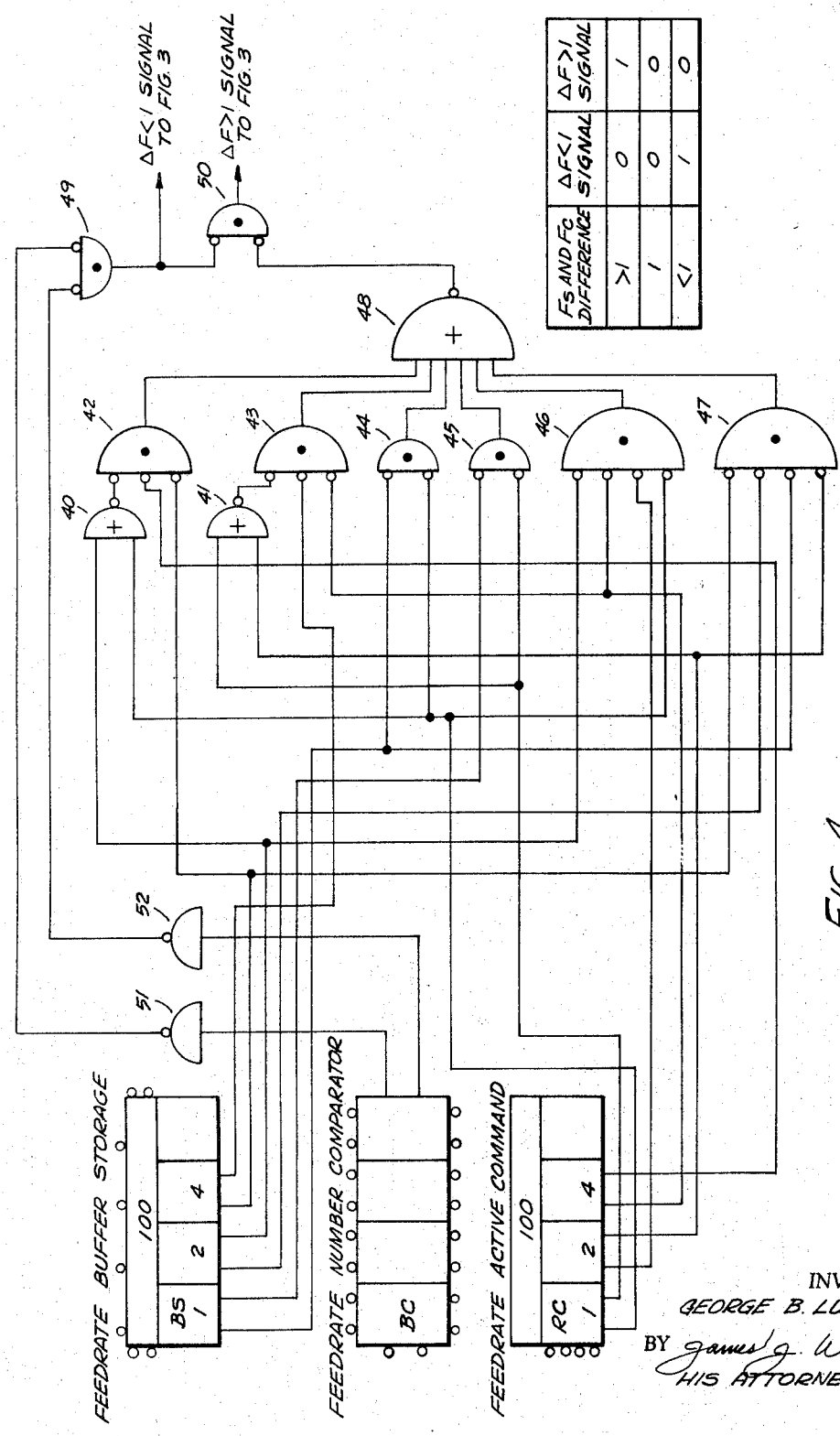

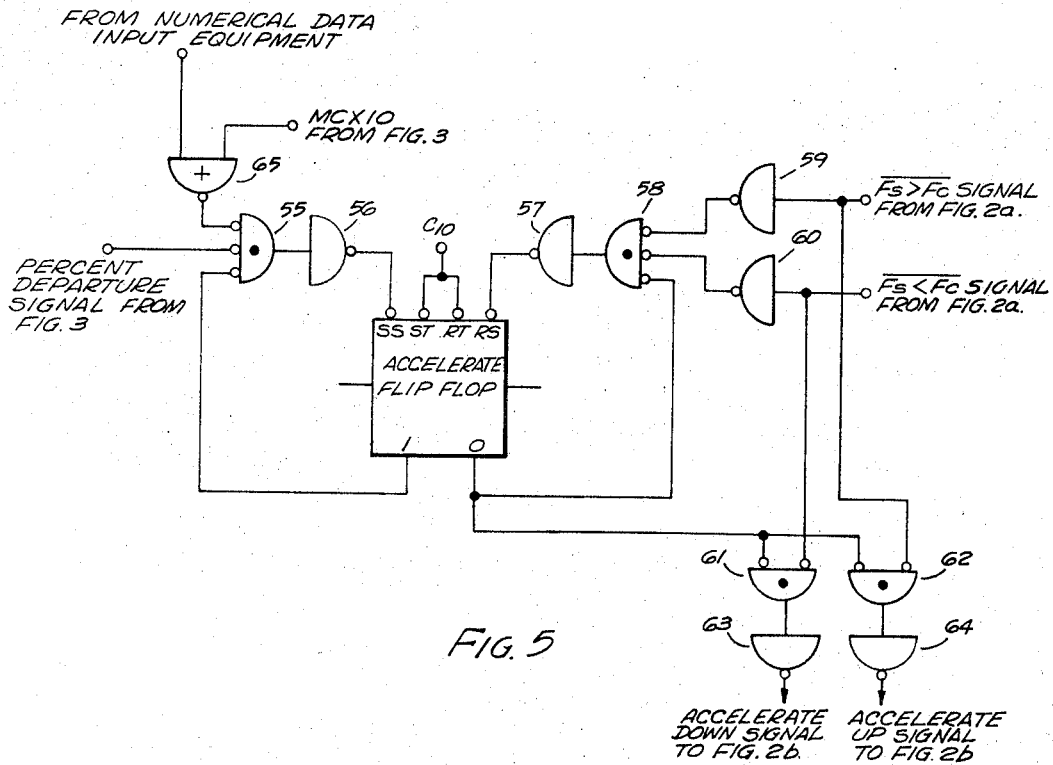
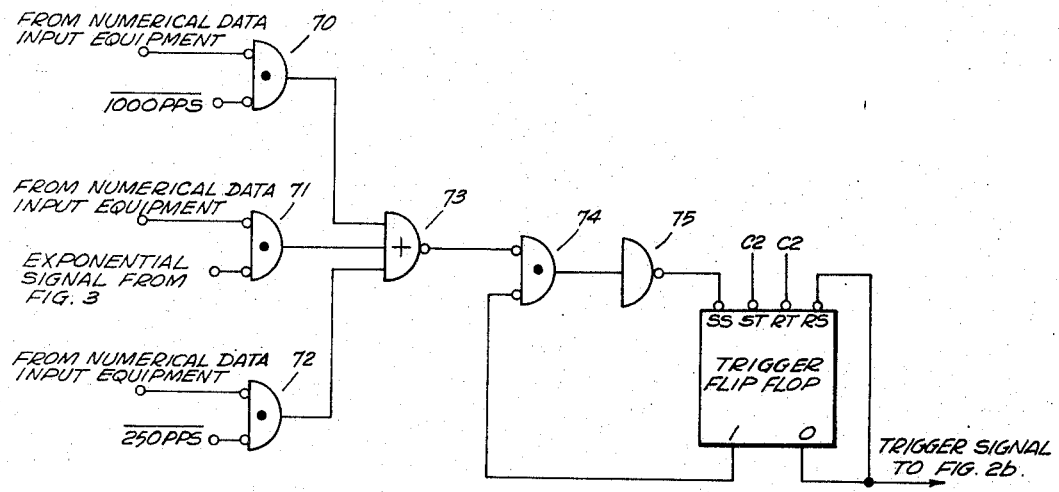

ature of the invention. Finally,

United States Patent Office 3,344,260
Patented Sept. 26, 1967

3,344,260
ACCELERATE-DECELERATE CONTROL
SYSTEM
George B. Lukens II, Waynesboro, Va., assignor to
General Electric Company, a corporation of New York
Filed Feb. 20, 1963, Ser. No. 259,912
5 Claims. (Cl. 235—151.11)

The invention relates to a control system, and particularly to a control system for accelerating or decelerating the relative movement of a machine tool and a workpiece at predetermined times.

Machine tool control systems are presently capable of operating machine tools in contouring (or shaping) functions in one, two, three, or more dimensions. One such control system is a numerical contouring control system in which numerical information continuously directs the motion or motions of a machine tool. One such numerical contouring control system is described and illustrated in a copending application entitled "Automatic Control Apparatus" filed in the name of L. U. C. Kelling on Sept. 5, 1961, Ser. No. 136,420 and now Patent No. 3,226,649. When a machine tool is contouring a workpiece in response to such a control system, it is desirable, particularly in a control system having a high servo gain, to keep overshoot at the end of a contouring cut at a minimum. This overshoot can be reduced by part of the contouring cut being made at a relatively high speed and by the remainder of the contouring cut being made at a lower of decelerating speed.

Accordingly, an object of the invention is to provide an improved numerical contouring control system.

Another object of the invention is to provide a numerical contouring control system with means for decelerating the movement of a machine tool.

With a numerical contouring control system having decelerating means, it is desirable that the deceleration be achieved as near the end of a contouring cut as possible so as to keep the time of the contouring cut as low as possible.

Accordingly, another object of the invention is to provide an improved numerical contouring control system which decelerates the movement of a machine tool at or near the end of a contouring cut.

Finally, it may be desirable that a numerical contouring control system have means for accelerating and decelerating the movement of a machine tool.

Accordingly, another object of the invention is to provide an improved numerical contouring control system which can provide acceleration or deceleration of the movement of a machine tool.

The invention is intended to be used with a numerical contouring control system which provides pulses from a system generator. These pulses are supplied to a contouring velocity command which, in response to input information, modifies the rate of the pulses so that the pulse rate indicates the desired speed or velocity of machine tool movement. After this velocity modification, the pulses are supplied to a function generator which, in response to input information, limits the number of pulses and resolves the pulses into one or more components which indicate one or more directions of machine tool movement. The resolved pulses are applied to a servo or operating portion which provides movement of the machine tool. The speed of the machine tool movement is indicated by the rate of pulses, and the distance of the relative movement is indicated by the number of the pulses.

Briefly, the invention provides an accelerate control which increases the pulse rate provided by the contouring velocity command in response to input information calling for acceleration, and which decreases the pulse rate provided by the contouring velocity command in response to input information calling for deceleration. The acceleration or deceleration rate may be steady or may be made to vary exponentially. Further, the deceleration may be begun during a given contouring cut at some departure distance from the beginning of the given contouring cut. This departure distance may have one of several values that is determined by the total distance of the contouring cut.

The invention is particularly pointed out in the claims. The invention may be better understod from the following description given in connection with the accompanying drawing, in which:

FIGURES 2a and 2b show more detailed diagrams of a contouring velocity command as used with the accelerate control of the invention;

FIGURE 3 shows a more detailed diagram of a portion of a slope function generator as used with the accelerate control of the invention;

FIGURE 4 shows a more detailed diagram of a feedrate number magnitude comparator as used with the accelerate control of the invention; and FIGURES 5 and 6 show more detailed diagrams of the accelerate control in accordance with the invention.

In the specification, a description will first be given of a numerical contouring control system. Then, a description will be given of the numerical contouring control system and the accelerate control of the invention. Finally, a description will be given of certain elements of the numerical contouring control system and the accelerate control of the invention.

*Numerical contouring control system—background*

Figure 1:
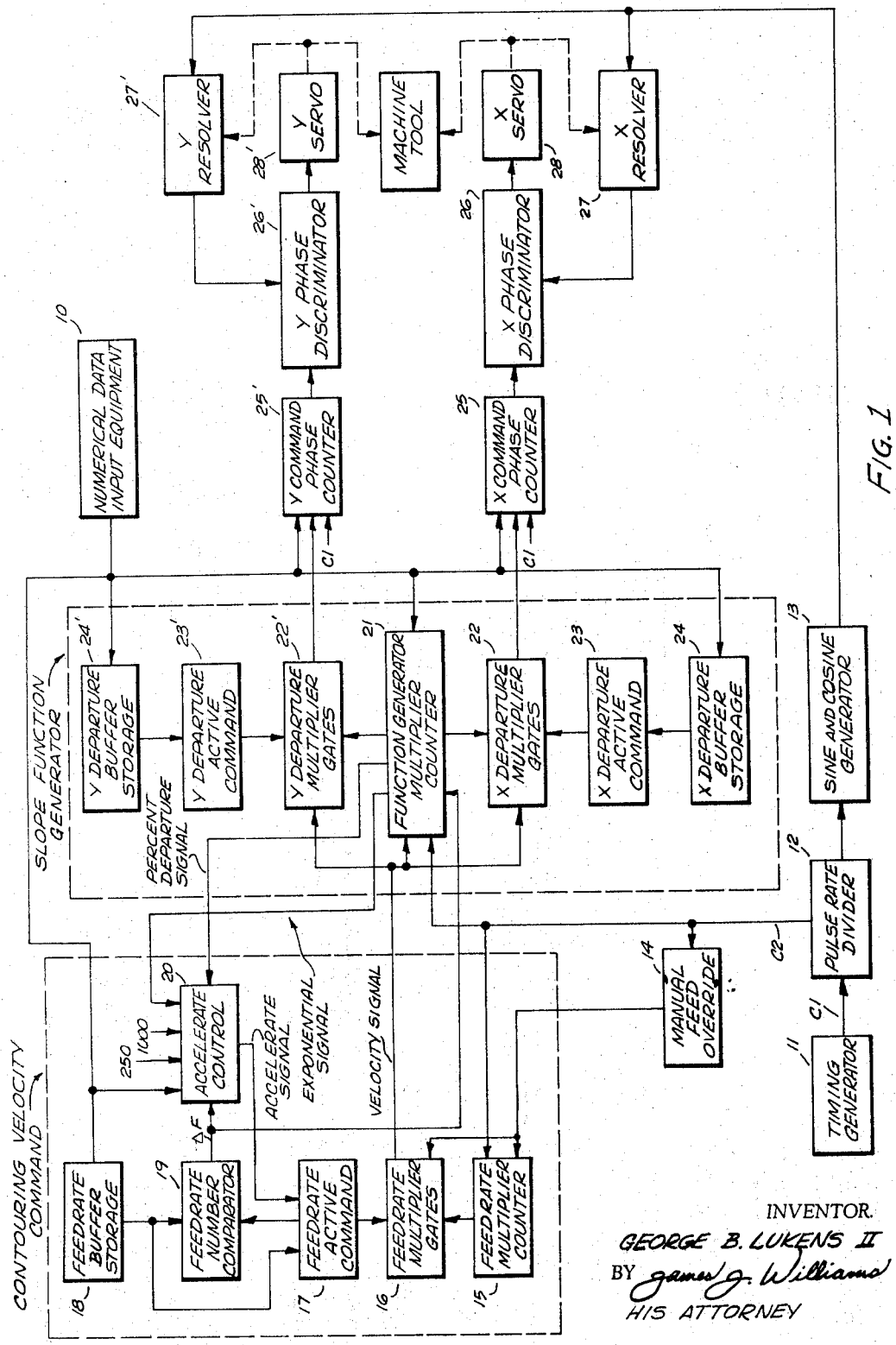
FIGURE 1 shows a block diagram of a numerical contouring control system and the accelerate control of the invention.

FIGURE 1 shows a block diagram of a numerical contouring control system and the accelerate control of the invention. The numerical contouring control system shown in FIGURE 1 is known in the art and provides an X axis and a Y axis of motion, but more or less axes of motion may be provided. The system shown in FIGURE 1 includes two main sections, the electronic control portion and the servo or operation portion. Both portions of the system are provided with numerical command information from numerical data input equipment 10. This information may be on a punched tape, a punched card, or a magnetic tape. Typically, this information indicates the speed of movement of a machine tool, the distance of movement of the machine tool, various functions, and the location at which the information is needed. The equipment 10 reads the commanded information and the commanded addresses, and generates appropriate electrical signals for controlling the movement of the machine tool. Signals from the input equipment 10 are coupled to various elements or portions of the control system. Both portions of the system also utilize pulses by which the commanded information is transported and indicated in the control portion of the system. The pulses are square wave pulses which vary between logic 0 (plus six volts) and logic 1 (zero volts). The pulses are produced by a pulse timing generator 11 at a C1 rate which typically is 250 kilocycles. This C1 rate is divided or reduced by a pulse rate divider 12 which produces pulses at a C2 rate and at other rates as will be indicated. The divider 12 also supplies pulses to a sine and cosine generator 13 which produces 250 cycle sine and cosine signals for use in the servo portion of the system. Pulses at the C1, C2, and other rates are coupled to the control and servo portions of the system.

In the control portion of the system, pulses from the pulse rate divider 12 are supplied to a manual feed override 14 which enables an operator to manually control the speed of movement of the machine tool. Pulses from the manual feed override 14 are supplied to a feedrate multiplier counter 15 in the contouring velocity command (which is enclosed in dashed lines). The contouring velocity command modifies the incoming pulse rate from the manual feed override 14 by an amount called for by the numerical data input equipment 10. This modification actually multiplies the incoming pulse rate by $\frac{1}{500}$ times a decimal command called the contouring feedrate number F. This contouring feedrate number F can vary from 0 to 500 in unit steps, and hence may have 500 different values. The contouring feedrate number F is expressed in units of inches per minute per 10 inches of contouring length. Mathematically, this is expressed as follows:

$$F = \frac{\text{Cutting velocity} \times 10}{\text{Contouring length}} \quad \text{(Formula 1)}$$

The contouring feedrate number F is introduced stored in a feedrate buffer storage 18. The feedrate number F is then transferred to a feedrate active command 17. The feedrate number F in the feedrate active command 17 is compared with the condition in the feedrate multiplier counter 15 as it counts in response to the pulses from the manual feed override 14. Whenever there is a corresponding condition, the feedrate multiplier gates 16 produce a pulse. The sequence of these pulses is the contouring velocity signal, the rate of these pulses being indicative of the desired speed of machine tool movement.

The contouring velocity signal is supplied to the function generator multiplier counter 21 in the slope function generator (which is enclosed in dashed lines). The slope function generator resolves the velocity signal into X and Y components as indicated by information from the numerical data input equipment 10. This information is supplied to X and Y buffer storages 24, 24' and transferred to X and Y active commands 23, 23'. The numbers in the active commands 23, 23' are compared with the condition in the multiplier counter 21 as its counts in response to pulses in the contouring velocity signal. Whenever there is a corresponding condition, X and Y multiplier gates 22, 22' produce a respective pulse. A sequence of these pulses is the contouring signal. The rates of these pulses in the sequences are indicative of the X and Y velocities, and the numbers of these pulses in the sequences are indicative of the relative distances traveled along the X and Y axes. These pulses are supplied to respective X and Y servo portions.

The servo or operating portion of the system provides movement of the machine tool along X and Y axes. This movement is produced by X and Y servos 28, 28' whose mechanical outputs are coupled to the machine tool and to X and Y resolvers 27, 27'. If these resolvers 27, 27' are suitably excited by signals from the sine and cosine generator 13, they provide voltages whose phases are the function of the mechanical angular position of the resolvers. In this way, the resolvers 27, 27' provide position feedback signals. These feedback signals are coupled to X and Y phase discriminators 26, 26' which compare the actual position of the machine tool as indicated by the resolvers 27, 27' with the commanded position of the machine tool as indicated by signals from X and Y phase counters 25, 25'. The phase counters 25, 25' receive input information, C1 rate pulses, and slope function generator signals. This comparison is made on a phase basis, and any difference in phase between the commanded signals and the feedback signals represents the difference between the commanded position and the actual position. This difference is utilized to produce an error signal which is fed into the X and Y servos 28, 28'. These servos effect or bring about the desired movement of the machine tool until it reaches the desired position.

*Numerical contouring control system and accelerate control*

The numerical contouring control system as thus far described is known in the art. With reference to FIGURE 1, the invention comprises the following elements; a feedrate number comparator 19 and an accelerate control 20. Certain modifications are also made in the feedrate active command 17 and in the function generator multiplier counter 21 to accommodate the accelerate control of the invention. In accordance with the invention, acceleration in an increasing velocity and deceleration in a decreasing velocity near the end of a contouring cut may be provided. As is known in the art, acceleration and deceleration at the beginning of a contouring cut may also be provided. This acceleration (and in this specification acceleration may be interpreted to mean acceleration in an increasing velocity or deceleration in a decreasing velocity) is provided by an accelerate signal which is applied to the feedrate active command 17 by the acelerate control 20. This accelerate signal provides trigger signals and a signal indicating whether the feedrate active command 17 should count up or down. These trigger signals are produced by the accelerate control 20 in response to input information from the numerical data input equipment 10 and from a 1,000 pulses per second (PPS) signal, or from a combination of 250 PPS signal and an exponential pulse signal. Or, some other combination of pulse rates or some other combination of pulse rates and an exponential pulse signal may be utilized. These combinations determine the rate of the trigger signals. If an up count is called for, an increasing velocity signal or acceleration is provided. If a down count is called for, a decreasing velocity signal or deceleration is provided.

Whether acceleration or deceleration is called for by an up or down signal is determined by the feedrate number comparator 19. This comparator 19 compares the magnitude of the feedrate number $F_S$ (indicative of the velocity to be achieved) present in the feedrate buffer storage 18 and the magnitude of the feedrate number $F_C$ (indicative of the actual instantaneous velocity) present in the feedrate active command 17. If the feedrate number $F_S$ in the buffer storage 18 is greater than the feedrate number $F_C$ in the command 17, acceleration in an increasing velocity direction is called for. Conversely, if the feedrate number $F_S$ in the buffer storage 18 is less than the feedrate number $F_C$ in the command 17, a deceleration in a decreasing velocity direction is called for. The comparator 19 produces a comparison signal indicated as $\Delta F$. This comparison signal $\Delta F$ actually contains two signals or pieces of information. One signal indicates whether the storage feedrate number $F_S$ is greater or less in magnitude than the command feedrate number $F_C$. This one signal is supplied to the accelerate control 20 to determine whether up signals (acceleration) or down signals (deceleration) are to be provided. The second signal indicates whether the most significant digits of the storage and command feedrate numbers $F_S$ and $F_C$ have a difference greater than (indicated $>$) one, less than (indicated $<$) one, or one. This second signal is supplied to the function generator multiplier counter 21 to determine the departure distance in a contouring cut at which deceleration should begin. Typical feedrate numbers, the magnitude differences (of their most significant digits), whether acceleration or deceleration is called for, and the departure (in percent of contouring distance) at which acceleration or deceleration begins are given in the following table:

TABLE 1

| $F_S$ | $F_C$ | Action | Magnitude Difference of Most Significant Digits | Departure, percent |
|-----|-----|--------------|-----|-----|
| 000 | 500 | Deceleration | >1  | 80  |
| 000 | 200 | ......do...... | >1  | 80  |
| 000 | 199 | ......do...... | 1   | 90  |
| 000 | 100 | ......do...... | 1   | 90  |
| 000 | 099 | ......do...... | <1  | 95  |
| 000 | 005 | ......do...... | <1  | 95  |
| 099 | 050 | ......do...... | <1  | 95  |
| 100 | 050 | ......do...... | 1   | 90  |
| 199 | 080 | ......do...... | 1   | 90  |
| 200 | 080 | ......do...... | >1  | 80  |
| 500 | 080 | ......do...... | >1  | 80  |

In the slope function generator, for a given contouring cut, the function generator multiplier counter 21 counts to 100,000 or to 1,000,000 depending upon whether the numerical data input equipment 10 calls for a ten inch or a 100 inch contouring cut, and then stops. Thus, the actual count in the function generator multiplier counter 21 relative to 100,000 or 1,000,000 indicates the actual percent departure of the machine tool relative to the total departure to be made for a contouring cut. When this actual percent reaches 80% or 90% or 95%, depending upon the magnitude difference of the storage and command feedrate numbers $F_S$ and $F_C$, a percent departure signal can be provided to the accelerate control 20 so that it produces an accelerate signal (containing trigger signals and an up or down signal). In this way, acceleration or more usually deceleration can be delayed so that acceleration begins when desired or deceleration is delayed as long as possible so that the higher contouring velocity is maintained as long as possible. In Table 1, it will be seen that feedrate numbers whose most significant digits have a difference greater than one result in deceleration (or acceleration) after a departure of 80%. Feedrate numbers whose most significant digits have a difference of one result in deceleration (or acceleration) after a departure of 90%. And feedrate numbers whose most significant digits have a difference less than one result in deceleration (or acceleration) after a departure of 95%.

In addition to providing the percent departure signal, the function generator multiplier counter 21 also provides the exponential signal previously mentioned. This exponential signal may be considered a feedback signal having a submultiple rate of the velocity pulses applied to the function generator multiplier counter 21. With such an exponential signal being fed back in acceleration, the command feedrate number $F_C$ varies as follows:

$$F_C = 500(1 - e^{-3.33t}) \quad \text{(Formula 2)}$$

In this and other formulas, 500 is the maximum feedrate number for this particular system, $e$ is the natural base, and $t$ is time in seconds after the beginning of acceleration or deceleration. With such an exponential signal being fed back in deceleration, the command feedrate number $F_C$ varies as follows:

$$F_C = 500 \times e^{-3.33t} \quad \text{(Formula 3)}$$

While accelerations and decelerations may be sufficient in accordance with these formulas, it was found that in decelerations, the numerical control system and the machine tool could withstand greater deceleration. Accordingly, an additional ramp or base deceleration frequency of 250 pulses per second (PPS) was provided. With the exponential signal being fed back in deceleration and with the base deceleration frequency of 250 cycles, the command feedrate number $F_C$ varies as follows:

$$F_C = 500 \times e^{-3.33t} - 250t \quad \text{(Formula 4)}$$

Other combinations of exponential variation and frequencies can be used. However, the particular deceleration signal represented by Formula 4 is a prefered one.

In brief summary, the accelerate control produces acceleration or deceleration by an accelerate signal which comprises trigger signals and an up or down signal. The trigger signals are produced at a rate determined by numerical input data, supplied frequencies, and exponential signals; and up (for acceleration) or down (for deceleration) signals are produced in response to whether the storage feedrate number $F_S$ is greater or less than the command feedrate number $F_C$. The accelerate signal is produced at a time determined by a percent departure signal, which in turn is produced at a time determined by whether the magnitude difference of the storage and command feedrate numbers $F_S$ and $F_C$ is greater than one (80%), one (90%), or less than one (95%).

*Contouring velocity command*

Figure 2A:
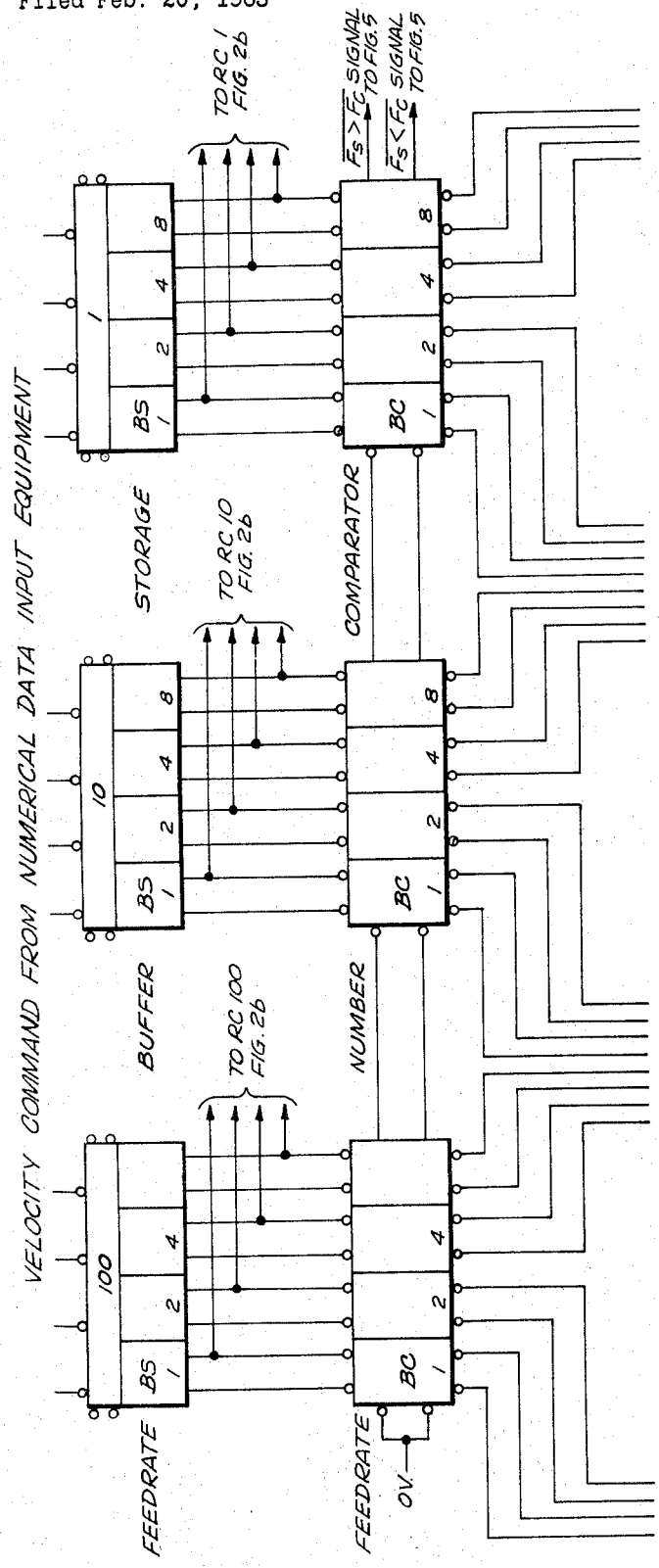

FIGURES 2a and 2b show more detailed diagrams of a contouring velocity command with additions and modifications for use with the accelerate control of the invention. The leads in the lower part of FIGURE 2a are normally connected with corresponding leads at the top of FIGURE 2b. The diagrams of FIGURES 2a and 2b generally have the same arrangement as their corresponding parts shown in block diagram in FIGURE 1. Thus, FIGURES 2a and 2b show the feedrate buffer storage 18, the feedrate number comparator 19, the feedrate active command 17, the feedrate multiplier counter 15, and the feedrate multiplier gates 16. The contouring velocity command includes three decades which have magnitudes of 100, 10, and 1 as indicated. Each decade of each element has four flip-flops having the indicated weights. These flip-flops are connected together for the indicated function of storage or counting. The feedrate buffer storage includes buffer storage flip-flops, the feedrate active command includes reversible counting flip-flops, the feedrate multiplier counter includes multiplier counter flip-flops, and the feedrate multiplier gates include such gates. The functions of these elements have been previously discussed in FIGURE 1. The feedrate active command is supplied with a trigger signal in its one decade, and with appropriate up or down signals in all its decades. To be effective, a trigger signal must vary from a logic 1 (zero volts in this particular system) to a logic 0 (plus six volts in this same system), and to be effective, an up or down signal must provide a logic 0. The reversible counters of the feedrate active command count in response to the trigger signals so that the feedrate active command reflects the information derived from the feedrate buffer storage and the count or input information supplied by trigger signals. Whether the feedrate active command counts up (and therefore has a greater command number) or counts down (and therefore has a lower command number) is determined by whether an up or a down signal is applied to all decades of the feedrate active command.

The contouring velocity command also includes a feedrate number comparator having three decades of four bit comparators each. These bit comparators are known in the art, and provide a bit by bit (actually a flip-flop by flip-flop) state comparison between the feedrate buffer storage decades and the feedrate active command decades. The output from the feedrate number comparator is shown in FIGURE 2a and is derived from the one decade. This output is indicated as a $\overline{F_S > F_C}$ signal and a $\overline{F_S < F_C}$ signal. If the numbers in the feedrate buffer storage and the feedrate active command are equal, both output signals from the feedrate number comparator are at a logic 1. If the information in the feedrate buffer storage differs from the information in the feedrate active command, then the output signals from the feedrate number comparators will be at a logic 0 and a logic 1. If the storage feedrate number $F_S$ is greater than the command feedrate number $F_C$, then the $\overline{F_S > F_C}$ signal will be a logic 0 and the $\overline{F_S < F_C}$ signal will be a logic 1. Conversely, if the storage feedrate number $F_S$ is less than the command feedrate number $F_C$, then the $\overline{F_S > F_C}$ signal will be a logic 1 and the $\overline{F_S < F_C}$ signal will be a logic 0. These signals are supplied to the accelerate control 20 (the pertinent portion being shown in detail in FIGURE 5). These signals determine whether an accelerate up or down signal is produced.

The 100 decade bit comparator in FIGURE 2a is also used to provide a feedrate number magnitude comparison of the most significant digit of the feedrate buffer storage information and the feedrate active command. This feedrate number magnitude comparator is shown in FIGURE 4.

*Slope function generator and multiplier counter*

FIGURE 3 shows a more detailed diagram of the function generator multiplier counter 21 of FIGURE 1 and the associated logic circuitry for the accelerate control 20. The other elements of the slope function generator are not shown since they are not directly pertinent to the accelerate control. The function generator multiplier counter of FIGURE 3 comprises six decades, each decade having four flip-flops of the indicated weights. These flip-flops count the incoming velocity signal pulses. As the count is made, the condition in the multiplier counter 21 is compared with the condition in both the X and Y active commands 23, 23'. When the X or Y command conditions correspond to the multiplier counter condition, the X or Y multiplier gates 22, 22' produce a respective pulse. For each contouring cut of ten inches, the multiplier counter 21 counts 100,000 contouring velocity signal pulses and then stops. For an extended contouring cut of one hundred inches, the sixth decade is activated by input information, and the multiplier counter 21 counts 1,000,000 contouring velocity signal pulses. In either length of cut, the percent departure signal is indicative of the last ten inches. This is all of a ten inch contouring cut, but only a part of a one hundred inch contouring cut. Since all decelerations or accelerations can be achieved in less than ten inches, excessive lost time, which would result if the percent departure signals were based on a one hundred inch cut, is eliminated. The exponential signal is derived from the four flip-flop of the 100 decade, and is produced each time this four flip-flop is set. This four flip-flop will be set twice for each 100 incoming velocity signal pulses. Signals for the logic circuitry are derived from the five flip-flop of the 1,000 decade, from the one, two, and five flip-flops of the 10,000 decade, and from the nine output of the 10,000 decade. An MCX10 signal is also derived from the nine output of the 100,000 decade to withhold the percent departure signal until the last ten inches of a one hundred inch contouring cut.

The logic circuitry of FIGURE 3 produces percent departure signals in response to the count in the function generator multiplier counter 21 and in response to $\Delta F$ signals indicative of the magnitude comparisons of the most significant digits of the storage and command feedrate numbers $F_S$ and $F_C$. These signals $\Delta F$ are supplied by the feedrate number magnitude comparator shown in FIGURE 4, and are indicated as being greater than ($>$) or less than ($<$) one. These signals $\Delta F$ are in the form of a logic 0 (which is normally plus six volts in the circuitry shown) or a logic 1 (which is zero volts in the circuitry shown) as shown in a logic truth table in FIGURE 4. The $\Delta F$ signal is applied to a logic inverter 30. If a logic 1 is applied, the inverter 30 produces a logic 0, and if a logic 0 is applied, the inverter 30 produces a logic 1. The output of the inverter 30 is applied to one input of a four-input NOR gate 31. The NOR gate 31 is sometimes referred to as a NOT AND gate which produces a logic 0 at its output if any one of its inputs is at logic 1; and which produces a logic 1 at its output if all of its inputs are at a logic 0. The other three inputs of the gate 31 are respectively coupled to the one, two, and five flip-flops of the 10,000 decade multiplier counter. The nine output of the 10,000 decade multiplier counter is supplied to an inverter 34, the output of which is coupled to an input of each of the two-input NOR gates 32, 33. The other input of the gate 32 is coupled to the five flip-flops of the 1,000 decade counter, and the other input of the gate 33 is supplied with the $\Delta F < 1$ signal. The outputs from the three gates 31, 32, 33 represent departures of 80%, 90%, and 95%. These outputs are applied to a three-input NOR gate 35, this gate 35 being sometimes called an OR NOT gate and having the same logic characteristics as the other gates 31, 32, 33. The gate 35 provides the percent departure signal.

The logic truth table of FIGURE 4 is for $\Delta F$ signals which are greater than one, one, and less than one. These logic values indicated in the truth table are supplied by the magnitude comparator of FIGURE 4 to the logic circuitry of FIGURE 3 as indicated. If the feedrate number magnitude comparison is greater than one, then the $\Delta F < 1$ signal is a logic 0 and the $\Delta F > 1$ signal is a logic 1. In FIGURE 3, the $\Delta F > 1$ signal of logic 1 is inverted to a logic 0 so as to make the NOR gate 31 permissive. The $\Delta F < 1$ signal of logic 0 also makes the gate 33 permissive. However, the percent departure signal will be produced by the gate 31 before it can be produced by the gate 33. With the gate 31 permissive, as soon as the 10,000 decade receives a count of eight (representing 80,000 pulses), the one, two, and five flip-flops supply logic 0 to the other three inputs of the gate 31 so that a logic 1 is produced by the gate 31. This logic 1 represents a departure of 80% in a contouring cut. That is, 80,000 pulses of the total 100,000 pulses have been counted. This operation occurs before the gates 32, 33 produce such a logic 1, since a count of 80,000 will be reached first. The logic 1 supplied by the gate 31 permits the gate 35 to produce a logic 0 which is supplied as the percent departure signal back to the accelerate control 20 which is shown in greater detail in FIGURES 5 and 6.

If the feedrate number magnitude comparison had been one, the $\Delta F > 1$ signal would be logic 0. The inverter 30 produces a logic 1 which is supplied to the input of the gate 31 so as to block this gate 31. Therefore, the gate 31 can not produce a logic 1 when 80,000 pulses are counted. However, the $\Delta F < 1$ signal is at a logic 0 which makes the gate 33 permissive. As soon as 90,000 pulses are counted in the 10,000 decade, the nine output supplies a logic 1 to the inverter 34. This provides a logic 0 which makes both inputs to the gate 33 at logic 0. The gate 33 then produces a logic 1 at its output which represents a 90% departure (i.e., 90,000 out of 100,000 pulses). This logic 1 is changed to a logic 0 percent departure signal by the gate 35. This occurs prior to the time that the gate 32 produces a logic 1 since 95,000 pulses have not been counted.

If the feedrate number magnitude comparison had been less than one, the $\Delta F > 1$ signal is still a logic 0. The inverter 30 produces a logic 1 that again blocks the gate 31. The $\Delta F < 1$ signal becomes a logic 1 which blocks the gate 33. Therefore although 80,000 and 90,000 pulses are counted, a percent departure signal is not produced. However, when 90,000 pulses are counted, the nine output of the 10,000 decade supplies a logic 1 which is inverted to a logic 0 by the inverter 34. When 5,000 more pulses (totaling 95,000 pulses) are counted, the five flip-flops of the 1,000 decade supplies a logic 0 to the gate 32. The gate 32 produces a logic 1 which represents a 95% departure (i.e., 95,000 out of 100,000 pulses). This logic 1 is changed to a logic 0 percent departure signal by the gate 35.

Thus, it will be seen that the logic circuitry shown in FIGURE 3 produces a percent departure signal, depending upon a magnitude comparison of the storage and command feedrate numbers $F_S$ and $F_C$ at 80%, 90%, or 95% of a given contouring function or operation depending upon whether the magnitude comparison is greater than one, is one, or is less than one.

*Feedrate number magnitude comparator*

FIGURE 4 shows the feedrate number magnitude comparator as it is coupled to the feedrate buffer storage, the feedrate number comparator, and the feedrate active command of the most significant digit (namely the 100 decade) of the contouring velocity command. The outputs of the one, two, and four flip-flops of the feedrate buffer storage and the feedrate active command are coupled to NOR gates 40–47 as shown (and are also connected as shown in FIGURES 2a and 2b). The outputs of the gates 42–47 are supplied to a six-input NOR gate 48. The output of the gate 48 is applied to one of the inputs of a NOR gate 50 which supplies the $\Delta F > 1$ signal. The outputs of the bit comparator are supplied to inverters 51, 52 (and are also connected as shown in FIGURES 2a and 2b). The inverters 51, 52 are coupled to a two-input NOR gate 49. It will be recalled from the explanation of the contouring velocity command that if the numbers seen by the feedrate number comparator in this one decade are equal (i.e., differ by less than one), both signals from the feedrate number comparator are at a logic 1. The inverters 51, 52 change both of these signals to a logic 0 so that the gate 49 produces a logic 1 for the $\Delta F < 1$ signal. If the numbers seen by the feedrate number comparator differ by one or more, then one output of the comparator is a logic 1 and one output of the comparator is a logic 0. The logic 0 output is inverted to a logic 1 which causes the gate 49 to produce a logic 0 for the $\Delta F < 1$ signal. This corresponds to the logic values shown for the $\Delta F < 1$ signals since the most significant decade comparison treats differences of one or more as unequal numbers and differences of less than one as equal numbers. The output of the gate 49 supplies the $\Delta F < 1$ signal and also the other input to the gate 50. The logic circuitry shown in FIGURE 4 will not be traced out in detail because the logic truth table shown in FIGURE 4 shows the logic values of the $\Delta F < 1$ signal and the $\Delta F > 1$ signal for magnitude differences of the storage and command feedrate numbers $F_S$ and $F_C$. If the storage feedrate number $F_S$ and the command feedrate number $F_C$ differ by more than one, then the $\Delta F < 1$ signal is a logic 0 and the $\Delta F > 1$ signal is a logic 1. If the numbers differ by one, both the $\Delta F < 1$ signal and the $\Delta F > 1$ signal are a logic 0. If the numbers differ by less than one, the $\Delta F < 1$ signal is a logic 1 and the $\Delta F > 1$ signal is a logic 0. These signals are utilized by the logic circuitry of FIGURE 3 as explained above.

*Accelerate control*

It will be recalled that the accelerate signal produced by the accelerate control includes trigger signals and an up or a down signal. The trigger signals have a rate indicative of the desired acceleration or deceleration, and the up or down signal determines whether the feedrate multiplier gates 16 produce an accelerating or a decelerating velocity signal. FIGURES 5 and 6 show the logic circuitry of the accelerate control 20 for producing these trigger signals and the accelerate up and down signals. In addition to the NOR logic gates and inverters previously described, the circuitry of FIGURES 5 and 6 utilize an accelerate flip-flop and a trigger flip-flop. These flip-flops have input terminals including a set steering input SS, a set trigger input ST, a reset trigger input RT, a reset steering input RS, and output terminals 1 and 0. When a flip-flop is set, it is in the one state with its output terminal 1 at a logic 1 and its output terminal 0 at a logic 0. When a flip-flop is reset, it is in the zero state with its output terminal 1 at a logic 0 and its output terminal 0 at a logic 1. The flip-flop may be controlled by signals at the input terminals. A logic 0 at the set or reset steering inputs SS or RS for a predetermined time prior to a trigger pulse steers the flip-flop, and permits the flip-flop to be respectively set or reset by a trigger pulse change from a logic 1 to a logic 0 at either the set trigger input ST or the reset trigger input RT. A flip-flop remains so set or reset after removal of the signals and until further signals are applied.

In FIGURE 5, the percent departure signal of logic 0, supplied by the logic circuitry of FIGURE 3, is applied to one input of a three-input NOR gate 55. The other inputs of the gate 55 are supplied by a two-input NOR gate 65 and the output terminal 1 of the accelerate flip-flop. One input for the gate 65 is supplied by the numerical data input equipment and the other input is supplied by the MCX10 signal from FIGURE 3. These inputs assure that the accelerate up or down signal is withheld until the last ten inches of a contouring cut. The output of the gate 55 is inverted by an inverter 56 and applied to the set steering input SS. The set trigger and reset trigger terminals ST and RT are supplied with C10 rate pulses by the timing generator 11. The $\overline{F_S > F_C}$ signal and the $\overline{F_S < F_C}$ signal are respectively applied through inverters 59, 60 to a three-input NOR gate 58. The other input of the gate 58 is supplied by the output terminal 0 of the accelerate flip-flop. The output of the gate 58 is inverted by an inverter 57 and applied to the reset steering input RS. The $\overline{F_S > F_C}$ signal and the $\overline{F_S < F_C}$ signal are also respectively applied to NOR gates 61, 62. The other inputs of the gates 61, 62 are coupled to the output terminal 0 of the accelerate flip-flop.

The bit comparator $\overline{F_S}$ and $\overline{F_C}$ signals of FIGURE 2a are both logic 1 if the storage and command feedrate numbers $F_S$ and $F_C$ are equal. If the storage feedrate number $F_S$ is greater than the command feedrate number $F_C$, the $\overline{F_S > F_C}$ signal is a logic 0 and the $\overline{F_S < F_C}$ signal is a logic 1. If the storage feedrate number $F_S$ is less than the command feedrate number $F_C$, the $\overline{F_S > F_C}$ signal is a logic 0 and the $\overline{F_S < F_C}$ signal is a logic 1. Whichever signal is a logic 1 blocks the associated one of the gates 61, 62. During the previous contouring cut, the accelerate flip-flop was set and permitted an accelerate up or down signal to be supplied. While the accelerate flip-flop was set (during the previous contouring cut), its output terminal 0 was at a logic 0. After the storage and command feedrate numbers $F_S$ and $F_C$ were made equal and the $\overline{F_S > F_C}$ and $\overline{F_S < F_C}$ signals became a logic 1, the inverters 59, 60 both supplied a logic 0 to the gate 58. Therefore, the gate 58 produced a logic 1 which was inverted to a logic 0 so that the accelerate flip-flop was provided with reset steering. The next C10 rate pulse reset the accelerate flip-flop so that its output terminal 1 became a logic 0 and its output terminal 0 became a logic 1. So when the storage and command feedrate numbers $F_S$ and $F_C$ become equal (usually at the end of the previous contouring cut), the logic 1 from the output terminal 0 blocks the gates 61, 62. The gates 61, 62 both produce a logic 0 which is inverted to a logic 1 by the inverters 63, 64. This prevents any acceleration up or down in the feedrate active command. The logic 0 from the output terminal 1 is applied to the gate 55.

On the next contouring cut, the numerical data input equipment 10 supplies a logic 1 (for a ten inch cut) to the gate 65 which produces a logic 0 at the gate 55. Or, on a one hundred inch cut, the numerical data input equipment supplies a logic 0 and not until 90,000 pulses have been counted does the MCX10 signal become a logic 1 to permit the gate 65 to produce a logic 0. In this way, the accelerate signal is withheld until the last ten inches. The only signal needed to again set the accelerate flip-flop is the logic 0 of a percent departure signal. If this percent departure signal of logic 0 is received, the gate 55 produces a logic 1 which is inverted to provide set steering. At the next C10 rate pulse the accelerate flip-flop is set. The output terminal 0 becomes a logic 0 to again make the gates 61, 62 permissive. As soon as either the storage feedrate number $F_S$ or the command feedrate number $F_C$ differ, one of the $\overline{F_S>F_C}$ or the $\overline{F_S<F_C}$ signals becomes a logic 0. The greater feedrate number determines which of the gates 61, 62 receives a logic 0. If the storage feedrate number $F_S$ is greater, the gate 62 receives a logic 0 from the $\overline{F_S>F_C}$ signal and produces a logic 1 which is inverted by the inverter 64 to provide a logic 0 accelerate up signal. This accelerate up signal agrees with the condition that the storage feedrate number $F_S$ is greater than the command feedrate number $F_C$ and that acceleration (in increasing velocity) is desirable. If the storage feedrate number $F_S$ is less than the command feedrate number $F_C$, the gate 61 receives a logic 0 from the $\overline{F_S<F_C}$ signal and produces a logic 1 which is inverted by the inverter 63 to produce a logic 0 accelerate down (hence decelerate) signal. This accelerate down or decelerate signal agrees with the condition that the storage feedrate number $F_S$ is less than the command feedrate number $F_C$. These accelerate up or down signals are supplied to the reversible counters and cause the feedrate active command to increase or decrease the number of velocity signal pulses supplied to the slope function generator.

The number of trigger pulses supplied in the accelerate signal is determined by the circuitry shown in FIGURE 6. The circuitry of FIGURE 6 receives a 1,000 pulses per second (PPS) signal, a 250 PPS signal, and the exponential pulse signal. While these pulse frequencies have been found preferred and practical, other frequencies can be used. The particular frequencies selected depend upon the operation desired. It is preferable to accelerate at 1,000 pulses per second, and to decelerate in an exponential fashion with a ramp pulse rate of 250 pulses per second as indicated by Formula 4. The particular frequency and hence pulse rate is determined by the numerical data input equipment 10 and NOR gates 70, 71, 72. If deceleration is desired, the gate 70 with the 1,000 PPS signal is supplied with a logic 1 from the numeral data input equipment 10 to block the gate 70 which makes its output a logic 0 and permissive. The numerical data input equipment 10 supplies a logic 0 to both gates 71, 72, and these gates 71, 72 alternately produce a logic 1 and a logic 0 at their respective outputs at rates determined by the exponential signal and by the 250 PPS signal. These signals are combined by a NOR gate 73 and supplied to a NOR gate 74. The gate 74 is also coupled to the output terminal 1 of the trigger flip-flop. The output of the gate 74 is inverted and supplied to the set steering terminal SS of this flip-flop. On a C2 rate pulse, the trigger flip-flop resets itself after being set because its output terminal 0 is coupled to the reset steering input RS. When the trigger flip-flop is reset, its output terminal 1 supplies a logic 0 so that the gate 74 is permissive to any logic 0 supplied by the exponential and other frequency signals. The gate 74 produces a logic 1 in response to such signals, and when it does so, the trigger flip-flop receives set steering and is set on the next $\overline{C2}$ rate pulse. When the trigger flip-flop is set, its zero terminal produces a logic 0 trigger signal which is supplied to the one decade reversible counter of the feedrate active command in FIGURE 2b. This trigger signal accelerates or decelerates the pulse rate of the velocity signal in accordance with whether up or down signals are provided. The trigger flip-flop is then immediately reset by the next C2 rate pulse and awaits the next set steering signal in response to the signals supplied so as to produce the next trigger signal.

Conclusion

It will be seen that the invention provides a new and improved accelerate control for use with numerical contouring systems. Although the embodiment shown and described provides a single accelerate control for two axes, it is to be understood that the accelerate control may operate for more than two axes or may operate for only a single axis. A separate accelerate control such as described and provided for each axis would accelerate or decelerate in different amounts along each respective axis. It is to be also understood that exponential pulse signals and the selected frequencies of 250 and 1,000 pulses per second have been found to be preferred in many embodiments, but other frequencies or types of signals may be used in certain applications. And finally, it is to be understood that the percent departure signals may be provided at any appropriate percents instead of the ones explained. Therefore, while the invention has been described with reference to particular embodiments, it is to be understood that modifications may be made without departing from the spirit of the invention or from the scope of the claims.

What I claim as new and desire to secure by Letters Patent of the United States is:

1. In a numerical control system having a velocity command that produces pulses having a rate which is variable and which is indicative of a desired velocity of operation, said velocity command comprising buffer storage means for accepting the next pulse rate command and means for storing the active pulse rate command, means for controlling system acceleration comprising a comparator coupled to said buffer storage and active command storage means for comparing the active command pulse rate with the desired stored pulse rate and producing first signals indicative of the greater and smaller of said rates and second signals indicative of the magnitude of difference of said rates, means for producing an accelerate signal in response to a departure signal, said accelerate signal having a selectable up and down characteristic determined by said first signals and having a predetermined pulse rate, means coupling said first signals from said comparator to said accelerate signal producing means for determining said up and down characteristic, departure means coupled to said comparator for producing said departure signal at distances controlled by said second signals, means coupling said departure signal from said departure means to said accelerate signal producing means, and means coupling said accelerate signal to said active command storage means for varying the rate of the pulses produced by said velocity command up and down in response to said up and down characteristic and in response to said predetermined pulse rate.

2. In a numerical control system having a velocity command that produces pulses having a rate which is variable and which is indicative of a desired velocity of operation, said velocity command comprising buffer storage means for accepting the next pulse rate command and means for storing the active pulse rate command, means for controlling system acceleration comprising a comparator coupled to said buffer storage and active command storage means for comparing the active command pulse rate with the desired stored pulse rate and producing first signals indicative of the greater and smaller of said rates and second signals indicative of the magnitude of difference of said rates, means for producing an accelerate signal in response to a departure signal, said accelerate signal having a selectable up and down characteristic determined by said first signals and having a selectable pulse rate determined by third signals, means coupling said first signals from said comparator to said accelerate signal producing means for determining said up and down characteristic, means coupled to said accelerate signal producing means for selectively supplying said third signals thereto to control the pulse rate of said accelerate signal, departure means coupled to said comparator for producing a departure signal at distances controlled by said second signals, and means coupling said accelerate signal to said active comand storage means for varying the rate of the pulses produced by said velocity command up and down in response to said up and down characteristic and at a rate controlled by said selected pulse rate.

3. In a numerical control system having a velocity command that produces pulses having a rate which is variable and which is indicative of a desired velocity of operation and having a function generator that modifies said pulses in accordance with the characteristic of said operation, said velocity command comprising buffer storage means for accepting the next pulse rate command and means for storing the active pulse rate command, means for controlling system acceleration comprising a comparator coupled to said buffer stage and active command storage means for comparing the active command pulse rate with the desired stored pulse rate and producing first signals indicative of the greater and smaller of said rates and second signals indicative of the magnitude of difference of said rates, means for producing an accelerate signal in response to a departure signal in an operation of said numerical control system, said accelerate signal having a selectable up and down characteristic determined by said first signals and having a selectable pulse rate determined by third signals, means coupling said first signals from said comparator to said accelerate signal producing means for determining said up and down characteristic, means coupled to said accelerate signal producing means for selectively supplying said third signals thereto to control the pulse rate of said accelerate signal, a deriving circuit coupled to said function generator for producing selectable departure signals which are respectively indicative of different departure distances in an operation of said numerical control system, means coupling said second signals to said deriving circuit for causing said deriving circuit to produce a departure signal that is indicative of the magnitude of difference of said active and desired pulse rates, means coupling said departure signal to said accelerate signal producing means to produce said accelerate signal at a distance controlled by said departure signal, and means coupling said accelerate signal to said active command storage means for varying the rate of the pulses produced by said velocity command up and down in response to said up and down characteristic and at a rate controlled by said selected pulse rate.

4. In a numerical control system having a velocity command that produces pulses having a rate which is variable and which is indicative of a desired velocity of operation and having a function generator that counts and resolves said pulses in accordance with the characteristic of said operation, said velocity command comprising buffer storage means for accepting the next pulse rate command and means for storing the active pulse rate command, means for controlling system acceleration comprising a comparator coupled to said buffer storage and active command storage means for comparing the active command pulse rate with the desired stored pulse rate and producing first signals indicative of the greater and smaller of said rates and second signals indicative of the magnitude of difference of said rates, means for producing an accelerate signal in response to a departure signal in an operation of said numerical control system, said accelerate signal having an up characteristic in response to said active command pulse rate being less than said stored pulse rate, having a down characteristic in response to said active command pulse rate being greater than said stored pulse rate, and having a selectable pulse rate determined by third signals, means coupling said first signals from said comparator to said accelerate signal producing means for determining said up and down characteristic, means coupled to said accelerate signal producing means for selectively supplying said third signals thereto to control the pulse rate of said accelerate signal, a deriving circuit coupled to said function generator for producing selectable departure signals which are respectively indicative of different departure distances in an operation of said numerical control system, means coupling said second signals to said deriving circuit for causing said deriving circuit to produce a departure signal that is indicative of the magnitude of difference of said active and desired pulse rates, means coupling said departure signal to said accelerate signal producing means to produce said accelerate signal at a distance controlled by said departure signal, and means coupling said accelerate signal to said active command storage means for varying the rate of the pulses produced by said velocity command up and down in response to said up and down characteristic and at a rate controlled by said selected pulse rate.

5. In a numerical control system having a velocity command that produces pulses having a rate which is variable and which is indicative of a desired velocity of operation and having a function generator that counts and resolves said pulses in accordance with the characteristic of said operation, said velocity command comprising buffer storage means for accepting the next pulse rate command and means for storing the active pulse rate command means for controlling system acceleration comprising a comparator coupled to said buffer storage and active command storage means for comparing the active command pulse rate with the desired stored pulse rate and producing first signals indicative of the greater and smaller of said rates and second signals indicative of the magnitude of difference of said rates, an accelerate control for producing an accelerate signal in response to a departure signal in an operation of said numerical control system, said accelerate signal having an up characteristic in response to said active command pulse rate being less than said stored pulse rate, having a down characteristic in response to said active command pulse rate being greater than said stored pulse rate, and having a selectable pulse rate determined by third signals, means coupling said first signals from said comparator to said accelerate signal producing means for determining said up and down characteristic, means coupled to said accelerate control for selectively supplying said third signals thereto to control the pulse rate of said accelerate signal, means coupled to said function generator for deriving a signal that varies exponentially with time, means for supplying said exponential signal to said accelerate signal producing means as one of said third signals, a deriving circuit coupled to said function generator for producing selectable departure signals which are respectively indicative of different departure distances in an operation of said numerical control system, means coupling said second signals to said deriving circuit for causing said deriving circuit to produce a departure signal that is indicative of the magnitude of difference of said active and desired pulse rates, means coupling said departure signal to said accelerate signal producing means to produce said accelerate signal, and means coupling said accelerate signal to said active command storage means for varying the rate of the pulses produced by said velocity command up and down in response to said up and down characteristic and at a rate controlled by said selected pulse rate.

References Cited

UNITED STATES PATENTS

| | | | |
|---|---|---|---|
| 2,817,775 | 12/1957 | Rosenberg et al. | 235—151.11 X |
| 3,120,603 | 2/1964 | Jones | 235—151.11 |
| 3,172,026 | 3/1965 | Schuman | 235—151.11 X |
| 3,174,367 | 3/1965 | Lukens | 235—151.11 X |

MALCOLM A. MORRISON, *Primary Examiner.*

I. KESCHNER, M. P. HARTMAN, *Assistant Examiners.*